United States Patent [19]

Galloway

[11] 4,196,176
[45] Apr. 1, 1980

[54] METHOD AND APPARATUS FOR CONTROLLING ACCIDENTAL RELEASES OF TRITIUM

[75] Inventor: Terry R. Galloway, Berkeley, Calif.

[73] Assignee: The United States of America as represented by the United States Department of Energy, Washington, D.C.

[21] Appl. No.: 930,629

[22] Filed: Aug. 3, 1978

[51] Int. Cl.$^2$ .................. C01B 50/02; B01J 8/02; G21C 9/00; B01J 37/18
[52] U.S. Cl. .................. 423/248; 176/19 LD; 176/37; 176/38; 252/411 R; 422/62; 422/105; 422/114; 422/117; 422/154; 422/173; 422/178; 422/182; 423/580
[58] Field of Search .............. 422/62, 114, 117, 178, 422/105, 182, 177, 173, 174, 159; 423/248, 580; 252/411 R; 176/19 LD, 37, 38

[56] References Cited

U.S. PATENT DOCUMENTS

| | | | |
|---|---|---|---|
| 2,758,063 | 8/1956 | MacLaren et al. | 252/411 R X |
| 2,816,857 | 12/1957 | Hemminges | 252/411 R X |
| 3,591,522 | 7/1971 | Cosyns et al. | 252/411 R X |
| 3,658,485 | 4/1972 | Gramer | 422/178 X |
| 3,679,366 | 7/1972 | Benson et al. | 422/117 X |
| 3,848,067 | 11/1974 | Cooper | 423/248 |
| 4,019,867 | 4/1977 | Fabian | 423/248 X |

OTHER PUBLICATIONS

Kerschner, Carl J.; "Tritium Effluent Control Project At Mound Laboratory", Proceedings of Symposium on Tritium Tech. Related to Fusion Reactor System; 10/1-2/74; U.S. ERDA, Jun. 1975.

*Primary Examiner*—Barry S. Richman
*Attorney, Agent, or Firm*—R. V. Lupo; Roger S. Gaither; William S. Bernheim

[57] ABSTRACT

An improvement in a tritium control system based on a catalytic oxidation reactor wherein accidental releases of tritium into room air are controlled by flooding the catalytic oxidation reactor with hydrogen when the tritium concentration in the room air exceeds a specified limit. The sudden flooding with hydrogen heats the catalyst to a high temperature within seconds, thereby greatly increasing the catalytic oxidation rate of tritium to tritiated water vapor. Thus, the catalyst is heated only when needed. In addition to the heating effect, the hydrogen flow also swamps the tritium and further reduces the tritium release.

6 Claims, 1 Drawing Figure

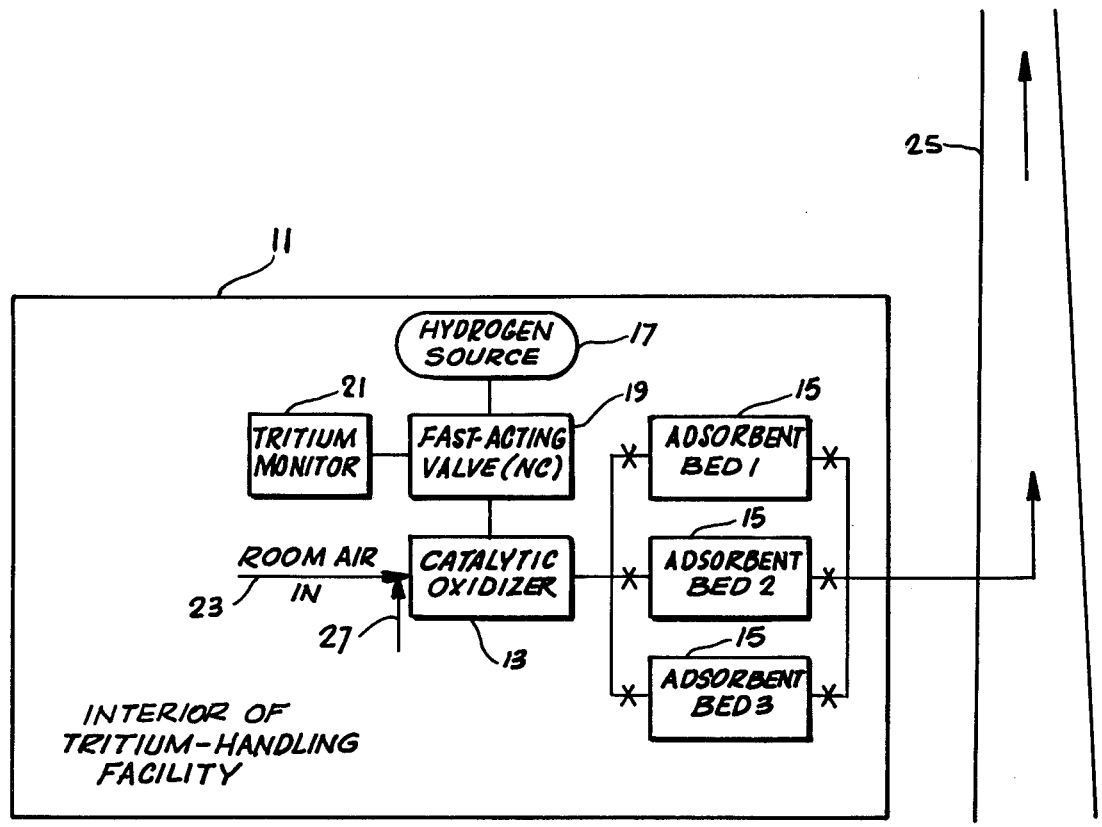

METHOD AND APPARATUS FOR CONTROLLING ACCIDENTAL RELEASES OF TRITIUM

BACKGROUND OF THE INVENTION

The invention described herein was made at Lawrence Livermore Laboratory in the course of or under United States Department of Energy Contract No. W-7405-ENG-48 with the University of California.

This invention relates to an improved tritium control system, particularly a tritium control system based on a catalytic oxidation reactor. More specifically, this invention relates to a system for controlling accidental releases of tritium into room air.

Current guidelines for tritium handling facilities require that tritium concentration in room air be maintained as low as practicable, which is generally interpreted to mean a tritium concentration of less than 10 microcurie ($\mu$Ci) per cubic meter of air. The room air in such facilities is first circulated through a heated catalyst which oxidizes gaseous tritium ($T_2$) to tritiated water vapor ($THO + T_2O$). The air stream is then passed through an absorbent bed which traps the tritiated water for subsequent disposal. Purified air is recirculated to the room interior.

The tritium removal system described above is normally in continuous operation to scavenge trace amounts of tritium from room air. Provision must also be made, however, for emergency hold-up of an accidental spike release of tritium with concentrations in the range of several curie per cubic meter of air (a million times greater than normal). Such an emergency tritium removal system is usually held in stand-by status to be activated by a tritium monitor when the tritium concentration exceeds a specified limit.

A conventional tritium effluent control system is described in "Tritium Effluent Control Project at Mound Laboratory" by Carl J. Kershner, in *Proceedings of the Symposium on Tritium Technology Related to Fusion Reactor Systems,* Oct. 1 and 2, 1974, U.S. Energy Research and Development Administration, June 1975. The tritium control system described by Kershner includes an emergency containment system (ECS) which is an automatically actuated room air detritiation system based on a catalytic oxidation reactor and water-presaturated adsorption/exchange column concept. The ECS is held in stand-by status. In the event of an accidental release of tritium to the laboratory or equipment rooms, the ECS is automatically activated and the quick action pneumatic dampers divert the room air supply and exhaust through the ECS and the air is recirculated until the room air concentrations are returned to safe operating levels.

One of the operating costs associated with emergency tritium hold-up systems is that of heating the catalyst. Electrical resistive heating of large catalyst beds can easily consume megawatts of power. This is a continuous operating cost since the emergency system must be maintained in constant readiness for an accidental tritium release. The cost for electricity is so prohibitive that the catalytic oxidizers in most systems are operated at room temperature, relying on increased catalyst mass to compensate for the decrease in catalytic efficiency at lower temperature. Since the catalyst is usually based on a noble metal such as palladium, platinum, or the like, the use of increased catalyst mass is itself a very expensive solution to the high cost of electrical heating.

SUMMARY OF THE INVENTION

The present invention provides an improved method and means for emergency containment of an accidental release of tritium into room air for use in tritium control systems based on a catalytic oxidation reactor. In accordance with the present invention, the catalyst is heated only when needed. This is accomplished by automatically flooding the catalytic oxidation reactor with hydrogen, preferably at a flow in at least stoichiometric amounts relative to the oxygen in the room air, when the tritium concentration of the air exceeds a prespecified level. The sudden dumping of hydrogen heats the catalyst to a high temperature within seconds, thereby activating the catalyst and greatly increasing the catalytic oxidation rate of tritium to tritiated water vapor. In a particular embodiment of the invention, means is provided for igniting the hydrogen in the catalytic oxidizer to insure initiation of combustion in the event that the catalyst has become inhibited as a result of exposure to moist room air.

In addition to its heating effect, the hydrogen flow also swamps the tritium spike, that is, it decreases the tritium partial pressure by perhaps a factor of 1000. The concentration of tritiated water admitted to the adsorber beds is thereby diluted by this same factor. Thus, the present system for tritium removal performs the dual functions of catalyst activation and hydrogen swamping by a simple inexpensive mechanism which is activated only in an emergency situation.

It is, therefore, an object of this invention to provide an improved tritium control system.

More particularly, it is an object of this invention to provide an improvement in a tritium control system based on a catalytic oxidation reactor.

Specifically, it is an object of this invention to provide a method and apparatus for controlling accidental releases of tritium into an atmosphere.

Other objects and advantages will become apparent from the following detailed description made with reference to the accompanying drawing.

BRIEF DESCRIPTION OF THE DRAWING

The FIGURE is a schematic representation of a tritium control system in accordance with the present invention.

DETAILED DESCRIPTION OF THE INVENTION

The invention will now be described in detail with reference to the FIGURE which is a schematic representation of a tritium handling facility containing an improved tritium control system in accordance with the present invention.

Referring to the FIGURE, numeral 11 represents a tritium handling facility. The tritium control system consists of a catalytic oxidation reactor 13 for catalytic oxidation of tritium to tritiated water vapor, and an adsorber bed system consisting of three adsorbent beds 15 for containment of the tritiated water vapor formed in reactor 13. Catalysts and adsorbents suitable for the aforementioned purposes are well established in the art.

A pressurized hydrogen source 17 is connected to reactor 13 by means of a normally closed fast-acting valve 19 which is actuatable by tritium monitor 21. Tritium monitors having 1$\mu$ Ci/m$^3$ sensitivity and a detection range from 1 to 20,000$\mu$ Ci/m$^3$ with digital and logarithmic recorder display are commercially available.

Under normal conditions, the catalytic oxidation reactor is operated at room temperature and valve 19 is closed. The normal room air also passes through the adsorber system, maintaining the adsorbent saturated with $H_2O$. Tritium monitor 21 is preset to actuate valve 19 when the monitor senses a concentration of tritium in the room air in excess of a specified safe operating level. Room air is introduced via line 23 into reactor 13, where oxidation of tritium to tritiated water vapor takes place, and is then circulated through the adsorbent beds 15 for containment of the tritiated water. The adsorbent in the beds can be removed and disposed of or regenerated in place when required. The purified air is vented to the atmosphere by means of stack 25. Means 27, such as a spark, may be provided to insure initiation of combustion of the hydrogen in the event that the catalyst has become inhibited as a result of exposure to moist room air.

In the event of an accidental release of tritium into the room air, the tritium monitor 21 automatically actuates valve 19 when the tritium concentration in the air exceeds the specified safe operating level, flooding the catalytic oxidation reactor with hydrogen. The catalyst is immediately heated by means of the heat generated by combustion of the hydrogen, thereby activating the catalyst and increasing the catalytic oxidation rate of tritium to tritiated water vapor. When the room air concentration is returned to a safe operating level, valve 19 is closed for normal operation. Thus, the catalyst is heated to high temperatures only when needed.

It is believed that catalyst activation is accomplished by the catalytically promoted reduction, by hydrogenation of oxides formed on the catalyst, whereby heat is generated. It is, therefore, desirable to provide a flow of hydrogen in at least stoichiometric amounts relative to the oxygen in the room air. Under normal operation, the catalyst may become sufficiently inhibited, as a result of continuous exposure to ordinary moist room air, that it may fail to respond to the hydrogen. In order to allow for such a contingency, it is desirable to provide a means for igniting the hydrogen in the catalytic oxidizer, with oxygen in the room air, to insure initiation of combustion and consequent activation of the catalyst.

As an example of the present invention, consider a 100,000 std $ft^3$/min capacity tritium effluent control system using a platinum/palladium catalyst, such as is commercially available, for example, from Air Products Corporation or Engelhard Industries, and a molecular sieve adsorbent system. Under normal conditions the system is operated around room temperature (40°-80° C.); room air passes through the catalytic oxidizer and the adsorbent beds, then out of the stack. Continuous exposure of the molecular sieve to ordinary moist room air maintains the sieve in a saturated condition at all times. A source of hydrogen under a pressure of about 1500 psig is connected to the catalyst oxidation reactor by means of a normally closed quick acting valve. A tritium monitoring device is preset to open the valve when the device senses a tritium concentration in the room air at some preset value in excess of $10\mu$ $Ci/m^3$ such as $40\mu$ $Ci/m^3$. In an emergency situation, the quick-acting valve is automatically opened to permit hydrogen flooding of the reactor at a flow in stoichiometric amounts to the oxygen in the air. A spark may be used to insure initiation of combustion. The catalyst is immediately heated, thereby activating the catalyst and increasing the catalytic oxidation rate of tritium to tritiated water vapor which is then trapped on the adsorption bed. The purified air is vented to the atmosphere. When the room air concentration is returned to a safe operating level, the quick acting valve is closed and normal operation is resumed.

For safety reasons, it is preferred to operate the present tritium effluent control systems as a "once through" system. That is, the purified air is vented to the atmosphere rather than recirculated. The present invention minimizes pollution of the atmosphere in the event of an accidental release of tritium. The present invention is useful in fusion research facilities, tritium confinement systems, or in facilities for the recovery of tritium from various forms of tritiated wastes.

Although the invention has been described with reference to a particular embodiment, it is to be understood that various changes and modifications may be made without departing from the true spirit of the invention.

What I claim is:
1. In a method for treating room air, which has been associated with a nuclear reactor and as a result normally contains generated tritium at low concentrations, to remove the tritium and including the step of introducing such air to a catalytic oxidation reactor to convert the tritium to tritiated water vapor, the improvement comprising:
   a. said catalytic reactor having therein under normal operation a substantial amount of inactive catalyst;
   b. monitoring the tritium concentration of the air being introduced to the catalytic reactor; and
   c. flooding the catalytic reactor with hydrogen gas, while said catalytic reacor continues to be on stream, when the monitoring detects a tritium concentration above said low concentration by a prespecified amount so that additional catalyst is activated to convert the additional amounts of tritium entering the catalytic reactor so that accidental release of tritium due to a rapid increase in its concentration in the room air is prevented.

2. The improved method of claim 1 further including simultaneously igniting the hydrogen, at least initially, when flooding.

3. The improved method of claim 1 further including recirculating at least a portion of the air passing through the catalytic reactor to the room air.

4. The improved method of claim 1 wherein the hydrogen is flooded at a rate to provide at least a stoichiometric amount of hydrogen to convert oxygen entering the catalytic reactor as part of the room air to water.

5. In a system including a catalytic oxidation reactor to which air, which has been associated with a nuclear reactor and normally contains as a result a low concentration of generated tritium, is introduced to remove such tritium by converting it to tritiated water vapor, the improvement comprising:
   a. said catalytic reactor having therein under normal operation a substantial amount of inactive catalyst;
   b. means for monitoring the tritium concentration of the room air prior to introduction into said catalytic reactor; and
   c. means for flooding hydrogen gas into the catalytic reactor, whi'e said catalytic reactor continues to be on stream in respnse to the monitoring means detecting a tritium concentration above said low concentration by a prespecified level amount so that accidental release of tritium due to a rapid increase in its concentration in the room air is prevented.

6. The improved system of claim 5 which further includes means for igniting hydrogen in the catalytic reactor.

* * * * *